United States Patent
Ogawa et al.

(10) Patent No.: US 12,374,718 B2
(45) Date of Patent: Jul. 29, 2025

(54) BATTERY MEMBER, METHOD FOR MANUFACTURING BATTERY MEMBER, AND SECONDARY BATTERY

(71) Applicant: LG ENERGY SOLUTION, LTD., Seoul (KR)

(72) Inventors: Hideyuki Ogawa, Tokyo (JP); Takuya Nishimura, Tokyo (JP); Yusuke Sera, Tokyo (JP); Masayo Horikawa, Tokyo (JP); Akihiro Orita, Tokyo (JP)

(73) Assignee: LG ENERGY SOLUTION. LTD., Seoul (KR)

( * ) Notice: Subject to any disclaimer, the term of this patent is extended or adjusted under 35 U.S.C. 154(b) by 718 days.

(21) Appl. No.: 17/610,154

(22) PCT Filed: May 22, 2019

(86) PCT No.: PCT/JP2019/020345
§ 371 (c)(1),
(2) Date: Nov. 10, 2021

(87) PCT Pub. No.: WO2020/235065
PCT Pub. Date: Nov. 26, 2020

(65) Prior Publication Data
US 2022/0231334 A1 Jul. 21, 2022

(51) Int. Cl.
*H01M 10/0565* (2010.01)
*H01M 4/04* (2006.01)
(Continued)

(52) U.S. Cl.
CPC ....... *H01M 10/0565* (2013.01); *H01M 4/505* (2013.01); *H01M 4/623* (2013.01);
(Continued)

(58) Field of Classification Search
CPC .. H01M 10/0565; H01M 4/505; H01M 4/623; H01M 4/625; H01M 10/0525;
(Continued)

(56) References Cited

U.S. PATENT DOCUMENTS

2017/0317387 A1* 11/2017 Inoue ................ H01M 10/0585
2019/0058215 A1* 2/2019 Dai .................... H01M 10/0565

FOREIGN PATENT DOCUMENTS

CN  106711498  * 5/2017
JP  H11-329061  11/1999
(Continued)

OTHER PUBLICATIONS

Extended Search Report in corresponding European Application No. 19929706.0, dated Mar. 28, 2022.
(Continued)

*Primary Examiner* — Lisa S Park
(74) *Attorney, Agent, or Firm* — Bryan Cave Leighton Paisner LLP

(57) ABSTRACT

A battery member includes: a current collector; an electrode mixture layer provided on the current collector; and an electrolyte layer provided on the electrode mixture layer, in which the electrode mixture layer contains an electrode active material, an organic solvent, a polymer, and an electrolyte salt, and the electrolyte layer contains a polymer, an oxide particle, and an electrolyte salt.

11 Claims, 5 Drawing Sheets

(51) Int. Cl.
| | |
|---|---|
| *H01M 4/139* | (2010.01) |
| *H01M 4/505* | (2010.01) |
| *H01M 4/62* | (2006.01) |
| *H01M 10/0525* | (2010.01) |
| *H01M 10/056* | (2010.01) |

(52) U.S. Cl.
CPC ....... *H01M 4/625* (2013.01); *H01M 10/0525* (2013.01); *H01M 2300/0082* (2013.01); *H01M 2300/0085* (2013.01); *H01M 2300/0091* (2013.01)

(58) Field of Classification Search
CPC . H01M 2300/0082; H01M 2300/0085; H01M 2300/0091; H01M 4/0404; H01M 10/056; H01M 4/139

See application file for complete search history.

(56) References Cited

FOREIGN PATENT DOCUMENTS

| | | | |
|---|---|---|---|
| JP | 2002216848 | * | 8/2002 |
| JP | 2003-022840 | | 1/2003 |
| JP | 2004-107641 | | 4/2004 |
| JP | 2005-310445 | | 11/2005 |
| JP | 2012-018909 | | 1/2012 |
| JP | 2015-090777 | | 5/2015 |
| WO | 2016/063835 | | 4/2016 |
| WO | 2018/193630 | | 10/2018 |

OTHER PUBLICATIONS

International Preliminary Report on Patentability with Written Opinion dated Dec. 2, 2021 for PCT/JP2019/020345.

International Search Report dated Aug. 13, 2019 for PCT/JP2019/020345.

Zhang et al. "Semiconductor photovoltaic cells," Xidian University Press, First Edition, Apr. 2015, pp. 275 (English translation provided).

* cited by examiner (a)

(b)

BATTERY MEMBER, METHOD FOR MANUFACTURING BATTERY MEMBER, AND SECONDARY BATTERY

CROSS-REFERENCE TO RELATED APPLICATIONS

This application is a 35 U.S.C. § 371 national phase application of PCT/JP2019/020345, filed on May 22, 2019.

TECHNICAL FIELD

The present disclosure relates to a battery member, a method for manufacturing the battery member, and a secondary battery.

BACKGROUND ART

In recent years, the diffusion rate of electronic automobiles and hybrid automobiles with small environmental load tends to increase. In these automobiles, secondary batteries such as nickel-hydrogen batteries or lithium ion secondary batteries are mounted. In secondary batteries for automobiles, high safety as well as battery characteristics is required. As a method of improving the safety of the secondary battery, a method of changing an electrolytic solution to a solid electrolyte has been known (for example, Patent Literature 1).

CITATION LIST

Patent Literature

Patent Literature 1: Japanese Unexamined Patent Publication No. 2004-107641

SUMMARY OF INVENTION

Technical Problem

However, in a conventional secondary battery, there is room for further improvement in safety, and an improvement in battery characteristics (for example, discharge characteristics and a capacity retention rate) without impairing safety cannot be necessarily achieved.

In this regard, an object of an aspect of the present invention is to provide a battery member with which a secondary battery excellent in safety and excellent in discharge characteristics and a capacity retention rate as well can be produced and a method for manufacturing the battery member.

Solution to Problem

The present inventors have found that an interface between the electrode active material and the electrolyte salt, which is an ion conductive component, and an interface between the electrode mixture layer and the electrolyte layer each are favorably formed by using the organic solvent in the electrode mixture layer so that the discharge characteristics and the capacity retention rate of the secondary battery can be improved, and further found that, although the safety is likely to be impaired generally in the case of using the organic solvent, by using the electrolyte layer containing a polymer, oxide particles, and an electrolyte salt, since the oxide particles secure insulation properties between electrodes, as compared to a conventional separator configured only by a polymer, short circuit between electrodes can be suppressed even at a temperature at which the separator is melted, so that the safety can also be increased.

An aspect of the present invention is a battery member including: a current collector; an electrode mixture layer provided on the current collector; and an electrolyte layer provided on the electrode mixture layer, in which the electrode mixture layer contains an electrode active material, an organic solvent, and an electrolyte salt, and the electrolyte layer contains a polymer, an oxide particle, and an electrolyte salt.

The organic solvent may include at least one selected from the group consisting of carbonic acid esters.

The electrode mixture layer may further contain a polymer capable of gelling the organic solvent.

Another aspect of the present invention is a secondary battery including the above-described battery member.

Still another aspect of the present invention is a method for manufacturing a battery member, the method including: a step (a) of adding a composition containing an organic solvent and an electrolyte salt into an electrode active material layer to form an electrode mixture layer in which the electrode active material layer contains an electrode active material and is provided on a current collector; and a step (b) of providing an electrolyte layer containing a polymer, an oxide particle, and an electrolyte salt on the electrode mixture layer.

The organic solvent may include at least one selected from the group consisting of carbonic acid esters.

The composition may further contain a polymer capable of gelling the organic solvent. In this case, the above-described manufacturing method may further include a step of heating the composition before the step (a).

The composition may further contain a polymerizable compound, and may be a compound that becomes a polymer capable of gelling the organic solvent by polymerization. In this case, the above-described manufacturing method may further include a step of polymerizing the polymerizable compound in the electrode mixture layer after the step (b).

In a case where the above-described composition further contains a polymer capable of gelling the organic solvent and a case where the above-described composition further contains a polymerizable compound that becomes a polymer capable of gelling the organic solvent by polymerization, the organic solvent can be gelled without the step of volatilizing the organic solvent, and thus a secondary battery having desired characteristics can be more suitably obtained. In addition, when the organic solvent and this polymer or this polymerizable compound are added in advance to the electrode mixture layer and then the organic solvent is gelled, it is not necessary to inject the electrolytic solution after the positive electrode, the electrolyte layer, and the negative electrode are laminated, and thus permeability of the electrolytic solution (particularly, permeability to the electrode mixture layer) that may be problematic when the secondary battery increases in area in order to increase the energy density can be secured.

Advantageous Effects of Invention

According to an aspect of the present invention, it is possible to provide a battery member with which a secondary battery excellent in safety and excellent in discharge characteristics and a capacity retention rate as well can be produced and a method for manufacturing the battery member.

DESCRIPTION OF EMBODIMENTS

Hereinafter, embodiments of the present invention will be described with reference to the drawings as appropriate. However, the present invention is not limited to the following embodiments. In the following embodiment, constituent elements thereof (including steps and the like) are not necessarily indispensable unless otherwise stated. The sizes of constituent elements in respective drawings are only illustrative, and relative size relationships between constituent elements are not limited to those illustrated in respective drawings.

In the present specification, a numerical value and a range thereof are not intended to limit the present invention. In the present specification, a numerical range that has been indicated by use of "to" indicates the range that includes the numerical values which are described before and after "to", as the minimum value and the maximum value, respectively. In the numerical ranges that are described stepwise in the present specification, the upper limit value or the lower limit value of the numerical range of a certain stage may be replaced with the upper limit value or the lower limit value of the numerical range of another stage. In the numerical ranges that are described in the present specification, the upper limit value or the lower limit value of the numerical value range may be replaced with the value shown in Examples.

Figure 1:
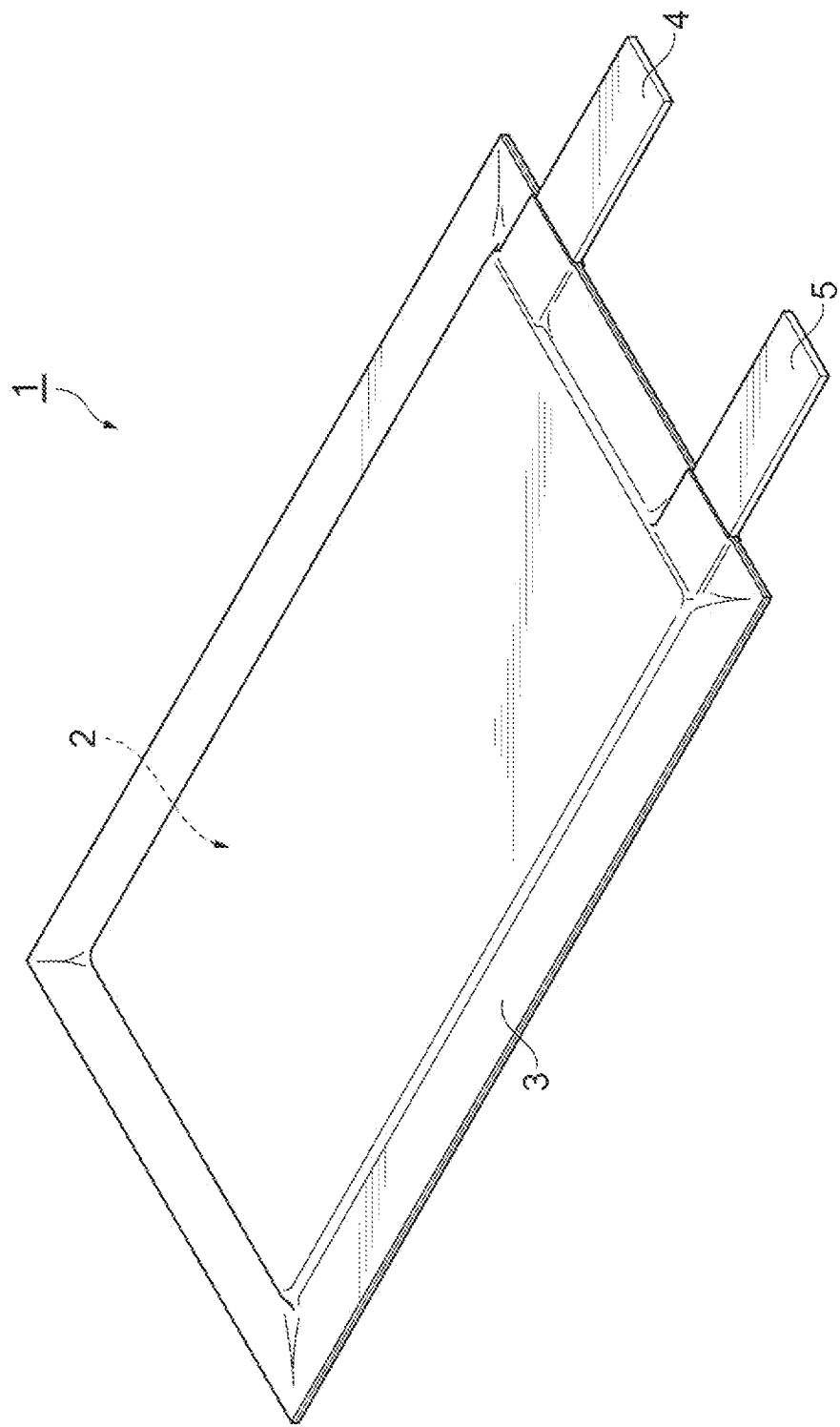
FIG. 1 is a perspective view illustrating a secondary battery according to an embodiment.

FIG. 1 is a perspective view illustrating a secondary battery according to an embodiment. As illustrated in FIG. 1, a secondary battery 1 includes an electrode group 2 configured by a positive electrode, a negative electrode, and an electrolyte layer and a bag-shaped battery outer casing body 3 accommodating the electrode group 2. A positive electrode current collector tab 4 and a negative electrode current collector tab 5 are provided in the positive electrode and the negative electrode, respectively. The positive electrode current collector tab 4 and the negative electrode current collector tab 5 protrude from the inside of the battery outer casing body 3 to the outside so that each of the positive electrode and the negative electrode can be electrically connected to the outside of the secondary battery 1.

The battery outer casing body 3 may be formed, for example, from a laminate film. The laminate film may be, for example, a laminate film in which a resin film such as a polyethylene terephthalate (PET) film, a metallic foil such as aluminum, copper, or stainless steel, and a sealant layer such as polypropylene are laminated in this order.

Figure 2:
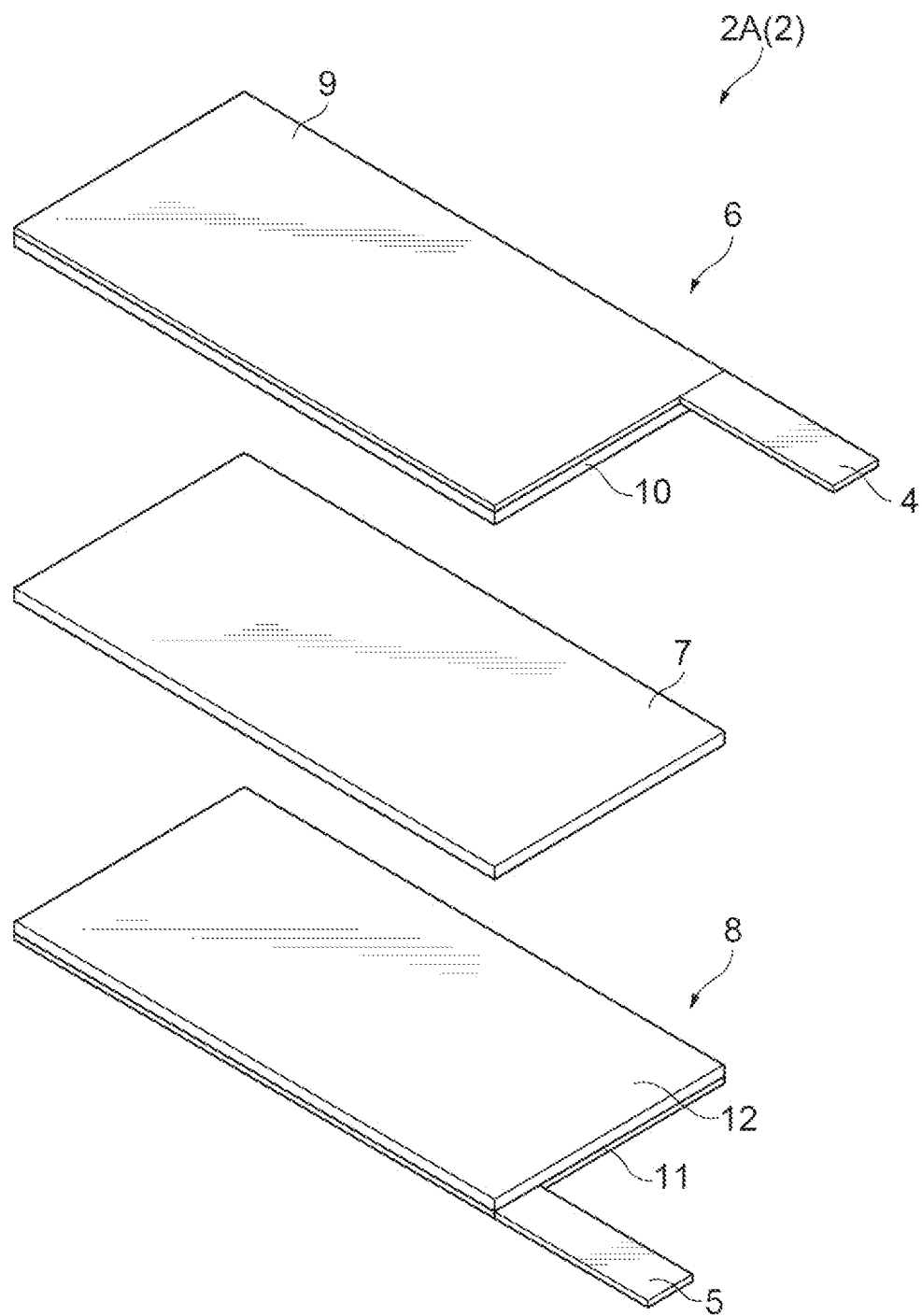
FIG. 2 is an exploded perspective view illustrating an embodiment of an electrode group of the secondary battery illustrated in FIG. 1.

FIG. 2 is an exploded perspective view illustrating an embodiment of the electrode group 2 of the secondary battery illustrated in FIG. 1. As illustrated in FIG. 2, an electrode group 2A according to an embodiment includes a positive electrode 6, an electrolyte layer 7, and a negative electrode 8 in this order. The positive electrode 6 includes a positive electrode current collector 9 and a positive electrode mixture layer 10 provided on the positive electrode current collector 9. The positive electrode current collector tab 4 is provided in the positive electrode current collector 9 of the positive electrode 6. The negative electrode 8 includes a negative electrode current collector 11 and a negative electrode mixture layer 12 provided on the negative electrode current collector 11. A negative electrode current collector tab 5 is provided in the negative electrode current collector 11 of the negative electrode 8. Note that, in the present specification, the positive electrode mixture layer 10 and the negative electrode mixture layer 12 are collectively called an electrode mixture layer. Similarly, a positive electrode active material and a negative electrode active material which will be described below are collectively called an electrode active material.

Figure 3:
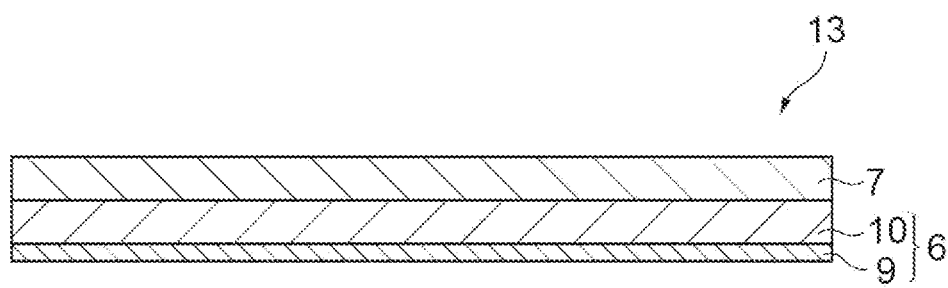
FIG. 3(a) is a schematic cross-sectional view illustrating a battery member (positive electrode member) for a secondary battery according to an embodiment.
FIG. 3(b) is a schematic cross-sectional view illustrating a battery member (negative electrode member) for a secondary battery according to another embodiment.
Figure 3:
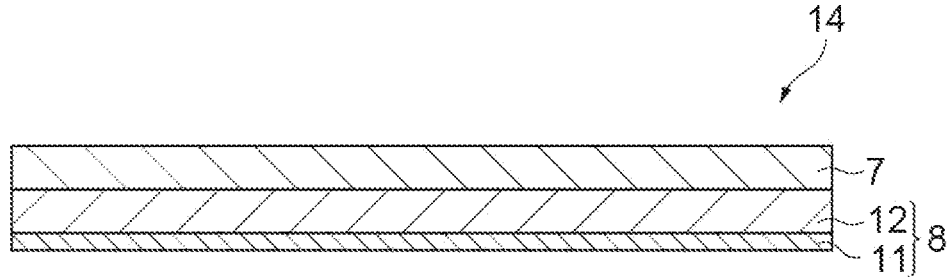

In an embodiment, it is conceivable that a first battery member (positive electrode member), which includes the positive electrode current collector 9, the positive electrode mixture layer 10, and the electrolyte layer 7 in this order, is included in the electrode group 2A. FIG. 3(a) is a schematic cross-sectional view illustrating a battery member (positive electrode member) for a secondary battery according to an embodiment, that is, a schematic cross-sectional view illustrating a first battery member (positive electrode member). As illustrated in FIG. 3(a), a first battery member 13 is a positive electrode member which includes the positive electrode current collector 9, the positive electrode mixture layer 10 provided on the positive electrode current collector 9, and the electrolyte layer 7 provided on the positive electrode mixture layer 10 in this order.

The positive electrode current collector 9 may be formed of a metal such as aluminum, titanium, or tantalum, or an alloy thereof. The positive electrode current collector 9 is preferably formed of aluminum or an alloy thereof in order to have lightness in weight and a high weight energy density.

In an embodiment, the positive electrode mixture layer 10 contains a positive electrode active material, an organic solvent, and an electrolyte salt (also referred to as "electrolyte salt A").

The positive electrode active material may be a lithium transition metal compound such as a lithium transition metal oxide or a lithium transition metal phosphate.

The lithium transition metal oxide may be, for example, lithium manganate, lithium nickelate, and lithium cobaltate. The lithium transition metal oxide may be a lithium transition metal oxide in which a part of a transition metal such as Mn, Ni, or Co contained in lithium manganate, lithium nickelate, lithium cobaltate, or the like is substituted with one or two or more kinds of other transition metals or a metal element (representative element) such as Mg or Al. That is, the lithium transition metal oxide may be a compound represented by LiM$^1$O$_2$ or LiM$^1$$_2$O$_4$ (M$^1$ includes at least one transition metal). The lithium transition metal oxide may be specifically Li(Co$_{1/3}$Ni$_{1/3}$Mn$_{1/3}$)O$_2$, LiN$_{1/2}$Mn$_{1/2}$O$_2$, LiNi$_{1/2}$Mn$_{3/2}$O$_4$, or the like.

From the viewpoint of further improving the energy density, the lithium transition metal oxide is preferably a compound represented by the following Formula (1):

$$Li_a Ni_b Co_c M^2{}_d O_{2+e} \qquad (1)$$

wherein $M^2$ is at least one selected from the group consisting of Al, Mn, Mg, and Ca, and a, b, c, d, and e are numbers satisfying $0.2 \leq a \leq 1.2$, $0.5 \leq b \leq 0.9$, $0.1 \leq c \leq 0.4$, $0 \leq d \leq 0.2$, $-0.2 \leq e \leq 0.2$, and $b+c+d=1$, respectively.

The lithium transition metal phosphate may be $LiFePO_4$, $LiMnPO_4$, $LiMn_xM^3_{1-x}PO_4$ ($0.3 \leq x \leq 1$, $M^3$ is at least one element selected from the group consisting of Fe, Ni, Co, Ti, Cu, Zn, Mg, and Zr), or the like.

The content of the positive electrode active material may be 70% by mass or more, 80% by mass or more, or 90% by mass or more, based on the total amount of the positive electrode mixture layer. The content of the positive electrode active material may be 99% by mass or less based on the total amount of the positive electrode mixture layer.

The organic solvent is a solvent that can dissolve the electrolyte salt A. In a case where the positive electrode mixture layer further contains a polymer A (the details thereof will be described below), the organic solvent is preferably a solvent that can dissolve the polymer A, and may be, for example, a solvent that can dissolve the polymer A at least at 100° C. Note that, an ionic liquid is not included in the organic solvent in the present specification.

The organic solvent may include, for example, at least one selected from the group consisting of an ester, an ether, an amide, a sulfoxide, and a sulfone, and preferably includes an ester. The organic solvent is used singly or in combination of two or more types thereof.

Examples of the ester include a carbonic acid ester, a fatty acid ester, a lactone, and a phosphoric acid ester. The organic solvent preferably includes a carbonic acid ester.

Examples of the carbonic acid ester include ethylene carbonate, propylene carbonate, butylene carbonate, vinylene carbonate, dimethyl carbonate, diethyl carbonate, ethyl methyl carbonate, chloroethylene carbonate, and chloropropylene carbonate.

Examples of the fatty acid ester include methyl propionate and ethyl propionate. Examples of the lactone include γ-butyrolactone. Examples of the phosphoric acid ester include phosphate triester.

The ether may be chain or cyclic. Examples of the chain ether include diethyl ether, 1,2-dimethoxyethane, 1,2-diethoxyethane, and trimethoxymethane. Examples of the cyclic ether include tetrahydrofuran, 2-methyltetrahydrofuran, and 1,3-dioxolane.

Examples of the amide include formamide and dimethylformamide. Examples of the sulfoxide include dimethyl sulfoxide. Examples of the sulfone include sulfolane.

The content (total content) of the organic solvent may be 1% by mass or more, 3% by mass or more, or 5% by mass or more, and may be 30% by mass or less, 20% by mass or less, or 10% by mass or less, based on the total amount of the positive electrode mixture layer.

The electrolyte salt A may be at least one selected from the group consisting of a lithium salt, a sodium salt, a calcium salt, and a magnesium salt.

The anion of the electrolyte salt A may be a halide ion (such as $I^-$, $Cl^-$, or $Br^-$), $SCN^-$, $BF_4^-$, $BF_3(CF_3)^-$, $BF_3(C_2F_5)^-$, $PF_6^-$, $ClO_4^-$, $SbF_6^-$, $N(SO_2F)_2^-$, $N(SO_2CF_3)_2^-$, $N(SO_2C_2F_5)_2^-$, $BPh_4^-$, $B(C_2H_4O_2)_2^-$, $C(FSO_2)_3^-$, $C(CF_3SO_2)_3^-$, $CF_3COO^-$, $CF_3SO_2O^-$, $C_6F_5SO_2O^-$, $[B(C_2O_4)_2]^-$, or the like. The anion is preferably $PF_6^-$, $BF_4^-$, $N(SO_2F)_2^-$, $N(SO_2CF_3)_2^-$, $[B(C_2O_4)_2]^-$, or $ClO_4^-$.

Note that, hereinafter, the following abbreviated expressions are used in some cases.

[FSI]$^-$: $N(SO_2F)_2^-$, bis(fluorosulfonyl)imide anion
[TFSI]$^-$: $N(SO_2CF_3)_2^-$, bis(trifluoromethane sulfonyl)imide anion
[BOB]$^-$: $[B(C_2O_4)_2]^-$, bis oxalate borate anion
[f3C]$^-$: $C(FSO_2)_3^-$, tris(fluorosulfonyl)carbanion The lithium salt may be at least one selected from the group consisting of $LiPF_6$, $LiBF_4$, Li[FSI], Li[TFSI], Li[f3C], Li[BOB], $LiClO_4$, $LiCF_3BF_3$, $LiC_2F_5BF_3$, $LiC_3F_7BF_3$, $LiC_4F_9BF_3$, $Li[C(SO_2CF_3)_3]$, $LiCF_3SO_3$, $LiCF_3COO$, and LiRCOO (R is an alkyl group having 1 to 4, a phenyl group, or a naphthyl group).

The sodium salt may be at least one selected from the group consisting of $NaPF_6$, $NaBF_4$, Na[FSI], Na[TFSI], Na[f3C], Na[BOB], $NaClO_4$, $NaCF_3BF_3$, $NaC_2F_5BF_3$, $NaC_3F_7BF_3$, $NaC_4F_9BF_3$, $Na[C(SO_2CF_3)_3]$, $NaCF_3SO_3$, $NaCF_3COO$, and NaRCOO (R is an alkyl group having 1 to 4, a phenyl group, or a naphthyl group).

The calcium salt may be at least one selected from the group consisting of $Ca(PF_6)_2$, $Ca(BF_4)_2$, $Ca[FSI]_2$, $Ca[TFSI]_2$, $Ca[f3C]_2$, $Ca[BOB]_2$, $Ca(ClO_4)_2$, $Ca(CF_3BF_3)_2$, $Ca(C_2F_5BF_3)_2$, $Ca(C_3F_7BF_3)_2$, $Ca(C_4F_9BF_3)_2$, $Ca[C(SO_2CF_3)_3]_2$, $Ca(CF_3SO_3)_2$, $Ca(CF_3COO)_2$, and $Ca(RCOO)_2$ (R is an alkyl group having 1 to 4, a phenyl group, or a naphthyl group).

The magnesium salt may be at least one selected from the group consisting of $Mg(PF_6)_2$, $Mg(BF_4)_2$, $Mg[FSI]_2$, $Mg[TFSI]_2$, $Mg[f3C]_2$, $Mg[BOB]_2$, $Mg(ClO_4)_2$, $Mg(CF_3BF_3)_2$, $Mg(C_2F_5BF_3)_2$, $Mg(C_3F_7BF_3)_2$, $Mg(C_4F_9BF_3)_2$, $Mg[C(SO_2CF_3)_3]_2$, $Mg(CF_3SO_3)_2$, $Mg(CF_3COO)_2$, and $Mg(RCOO)_2$ (R is an alkyl group having 1 to 4, a phenyl group, or a naphthyl group).

Among these, from the viewpoint of dissociability and electrochemical stability, the electrolyte salt A is preferably at least one selected from the group consisting of $LiPF_6$, $LiBF_4$, Li[FSI], Li[TFSI], Li[f3C], Li[BOB], $LiClO_4$, $LiCF_3BF_3$, $LiC_2F_5BF_3$, $LiC_3F_7BF_3$, $LiC_4F_9BF_3$, $Li[C(SO_2CF_3)_3]$, $LiCF_3SO_3$, $LiCF_3COO$, and LiRCOO (R is an alkyl group having 1 to 4, a phenyl group, or a naphthyl group), more preferably at least one selected from the group consisting of Li[TFSI], Li[FSI], $LiPF_6$, $LiBF_4$, Li[BOB], and $LiClO_4$, and further preferably Li[TFSI] or Li[FSI].

The content of the electrolyte salt A may be 0.1% by mass or more, 0.4% by mass or more, or 0.7% by mass or more, and may be 4.8% by mass or less, 3.2% by mass or less, or 1.6% by mass or less, based on the total amount of the positive electrode mixture layer.

The concentration of the electrolyte salt A per unit volume of the organic solvent may be 0.3 mol/L or more, 0.6 mol/L or more, or 1.0 mol/L or more, and may be 2.0 mol/L or less, 1.7 mol/L or less, or 1.5 mol/L or less.

The positive electrode mixture layer 10 preferably further contains a polymer capable of gelling the organic solvent (also referred to as "polymer A") from the viewpoint of further suppressing the liquid leakage of the organic solvent (electrolytic solution) from the secondary battery 1. In this case, since the organic solvent in the positive electrode mixture layer 10 is gelled, the liquid leakage of the organic solvent from the secondary battery 1 can be suppressed.

In the present specification, the polymer capable of gelling the organic solvent means a polymer that can considerably decrease flowability of the organic solvent, and specifically means a polymer in which a distance between a position A and a position B in the following flowability evaluation is less than 1 cm.

First, 5 g of a mixture of the organic solvent and the polymer capable of gelling the organic solvent (polymer A) (the organic solvent/the polymer A=90/10 (mass ratio)) is put into a glass vial (manufactured by AS ONE CORPORATION, LABORAN screw tube jar No. 4, 13.5 mL, a cylindrical shape having a diameter of bottom surface of about 2 cm and a height of about 4 cm) and then is covered with a lid. Subsequently, the polymer A is melted at a temperature equal to or higher than the glass transition temperature of the polymer A and then left to stand still at 25° C. for 20 hours in a state where the bottom surface side of the glass vial faces downward and the lid side faces upward. The position of the outermost surface of the mixture of the organic solvent and the polymer A in the glass vial after being left to stand still (the surface furthest away from the bottom surface of the glass vial) is designated as the position A. Thereafter, the glass vial is left to stand still at 25° C. for 10 minutes in a state where the glass vial is placed upside down (the bottom surface side of the glass vial faces upward and the lid side faces downward). The position of the lowermost surface of the mixture of the organic solvent and the polymer A in the glass vial after being left to stand still (the surface furthest away from the bottom surface of the glass vial) is designated as the position B. The flowability is evaluated based on the distance between the position A and the position B obtained in this way.

The polymer A may be, for example, a polymer including, as a monomer unit, at least one selected from the group consisting of vinylidene fluoride, hexafluoropropylene, acrylonitrile, methyl methacrylate, N-isopropylacrylamide, methyl acrylate, styrene, pentaerythritol tetraacrylate, diallyldimethyl ammonium-bis(trifluoromethane sulfonyl) imide, 2,2,3,3,4,4,5,5,6,6,7,7-dodecafluoroheptyl acrylate, 2,2,3,3,4,4,5,5,6,6,7,7-dodecafluoroheptyl methacrylate, (ethylene glycol) methacrylate, trimethylolpropane triacrylate, isoprene monoxide, and ethylene glycol diglycidylether.

The polymer A may be a homopolymer including only one kind of the above-described monomer unit, may be a copolymer including two or more kinds of the above-described monomer units, and may be a copolymer including one or more kinds of the above-described monomer unit and one or more kinds of a monomer unit other than the above-described monomer unit.

Examples of the homopolymer include polyvinylidene fluoride, polyacrylonitrile, polymethylacrylate, polymethylmethacrylate, poly(N-isopropylacrylamide), poly(diallyldimethyl ammonium-bis(trifluoromethane sulfonyl)imide), 2,2,3,3,4,4,5,5,6,6,7,7-dodecafluoroheptyl acrylate polyacrylate, 2,2,3,3,4,4,5,5,6,6,7,7-dodecafluoroheptyl polymethacrylate, polyacrylamide, polyglycidyl methacrylate, and polyethyleneglycol. Examples of the copolymer includes a copolymer of vinylidene fluoride and hexafluoropropylene and a copolymer of methyl methacrylate and oxetanyl methacrylate.

As for the polymer A, the polymer as described above is used singly or in combination of two or more types thereof. The polymer A is preferably at least one selected from the group consisting of a polymer including pentaerythritol tetraacrylate as a monomer unit, a copolymer of polyvinylidene fluoride, vinylidene fluoride, and hexafluoropropylene, and a copolymer of methyl methacrylate and oxetanyl methacrylate, from the viewpoint of increasing the lifetime and the input and output of the secondary battery 1.

The content of the polymer A may be 0.01% by mass or more, 0.10% by mass or more, or 1% by mass or more, and may be 20% by mass or less, 10% by mass or less, or 5% by mass or less, based on the total amount of the positive electrode mixture layer.

The content of the polymer A may be 0.5 parts by mass or more, 2 parts by mass or more, or 4 parts by mass or more, and may be 20 parts by mass or less, 15 parts by mass or less, or 10 parts by mass or less, with respect of 100 parts by mass of the total content of the organic solvent, the electrolyte salt, and the polymer A.

The positive electrode mixture layer 10 may further contain an ionic liquid. The ionic liquid contains an anion component and a cation component described below. Note that, the ionic liquid in the present specification is a substance that is in a liquid form at −20° C. or higher.

The anion component of the ionic liquid is not particularly limited, and may be a halogen anion such as $Cl^-$, $Br^-$, or $I^-$, an inorganic anion such as $BF_4^-$ or $N(SO_2F)_2^-$, an organic anion such as $B(C_6H_5)_4^-$, $CH_3SO_3^-$, $CF_3SO_3^-$, $N(C_4F_9SO_2)_2^-$, $N(SO_2CF_3)_2^-$, or $N(SO_2CF_2CF_3)_2^-$, or the like. The anion component of the ionic liquid preferably contains at least one selected from the group consisting of $B(C_6H_5)_4^-$, $CH_3SO_3^-$, $N(C_4F_9SO_2)_2^-$, $CF_3SO_3^-$, $N(SO_2F)_2^-$, $N(SO_2CF_3)_2^-$, and $N(SO_2CF_2CF_3)_2^-$, and from the viewpoint of further improving ion conductivity at a relatively low viscosity and also further improving charge and discharge characteristics, the anion component more preferably contains at least one selected from the group consisting of $N(C_4F_9SO_2)_2^-$, $CF_3SO_3^-$, $N(SO_2F)_2^-$, $N(SO_2CF_3)_2^-$, and $N(SO_2CF_2CF_3)_2^-$ and further preferably contains $N(SO_2F)_2^-$.

The cation component of the ionic liquid is not particularly limited, and is preferably at least one selected from the group consisting of a chain quaternary onium cation, a piperidinium cation, a pyrrolidinium cation, a pyridinium cation, and an imidazolium cation.

The chain quaternary onium cation is, for example, a compound represented by the following Formula (2):

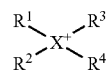

(2)

wherein $R^1$ to $R^4$ each independently represent a chain alkyl group having 1 to 20 carbon atoms or a chain alkoxyalkyl group represented by $R-O-(CH_2)_n-$ (R represents a methyl group or an ethyl group, and n represents an integer of 1 to 4), and X represents a nitrogen atom or a phosphorus atom. The number of carbon atoms of the alkyl group represented in $R^1$ to $R^4$ is preferably 1 to 20, more preferably 1 to 10, and further preferably 1 to 5.

The piperidinium cation is, for example, a 6-membered cyclic compound containing nitrogen and represented by the following Formula (3):

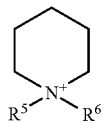

(3)

wherein $R^5$ and $R^6$ each independently represent an alkyl group having 1 to 20 carbon atoms or an alkoxyalkyl group represented by $R-O-(CH_2)_n-$ (R represents a methyl group or an ethyl group, and n represents an integer of 1 to 4). The number of carbon atoms of the alkyl group represented in $R^5$ and $R^6$ is preferably 1 to 20, more preferably 1 to 10, and further preferably 1 to 5.

The pyrrolidinium cation is, for example, a 5-membered cyclic compound represented by the following Formula (4):

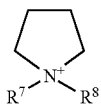
(4)

wherein $R^7$ and $R^8$ each independently represent an alkyl group having 1 to 20 carbon atoms or an alkoxyalkyl group represented by R—O—$(CH_2)_n$— (R represents a methyl group or an ethyl group, and n represents an integer of 1 to 4). The number of carbon atoms of the alkyl group represented in $R^7$ and $R^8$ is preferably 1 to 20, more preferably 1 to 10, and further preferably 1 to 5.

The pyridinium cation is, for example, a compound represented by the following Formula (5):

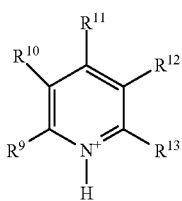
(5)

wherein $R^9$ to $R^{13}$ each independently represent an alkyl group having 1 to 20 carbon atoms, an alkoxyalkyl group represented by R—O—$(CH_2)_n$— (R represents a methyl group or an ethyl group, and n represents an integer of 1 to 4), or a hydrogen atom. The number of carbon atoms of the alkyl group represented in $R^9$ to $R^{13}$ is preferably 1 to 20, more preferably 1 to 10, and further preferably 1 to 5.

The imidazolium cation is, for example, a compound represented by the following Formula (6):

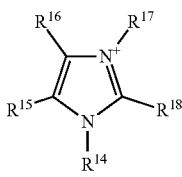
(6)

wherein $R^{14}$ to $R^{18}$ each independently represent an alkyl group having 1 to 20 carbon atoms, an alkoxyalkyl group represented by R—O—$(CH_2)_n$— (R represents a methyl group or an ethyl group, and n represents an integer of 1 to 4), or a hydrogen atom. The number of carbon atoms of the alkyl group represented in $R^{14}$ to $R^{18}$ is preferably 1 to 20, more preferably 1 to 10, and further preferably 1 to 5.

The content of the ionic liquid may be 3% by mass or more, 5% by mass or more, or 10% by mass or more, and may be 30% by mass or less, 25% by mass or less, or 20% by mass or less, based on the total amount of the positive electrode mixture layer.

The positive electrode mixture layer 10 may further contain an electrically conductive agent, a binder, and the like.

The electrically conductive agent is not particularly limited, and may be a carbon material such as graphite, acetylene black, carbon black, or a carbon fiber. The electrically conductive agent may be a mixture of two or more kinds of the aforementioned carbon materials.

The content of the electrically conductive agent may be 0.01% by mass or more, 0.1% by mass or more, 1% by mass or more, or 3% by mass or more, and may be 15% by mass or less, 10% by mass or less, or 8% by mass or less, based on the total amount of the positive electrode mixture layer.

The binder is not particularly limited, and may be a polymer containing, as a monomer unit, tetrafluoroethylene, acrylic acid, maleic acid, ethyl methacrylate, or the like (provided that, excluding the aforementioned polymer A), rubber such as styrene-butadiene rubber, isoprene rubber, or acrylic rubber, or the like.

The content of the binder may be 0.010% by mass or more, 0.10% by mass or more, 1% by mass or more, or 3% by mass or more, and may be 15% by mass or less, 10% by mass or less, or 8% by mass or less, based on the total amount of the positive electrode mixture layer.

The thickness of the positive electrode mixture layer 10 may be 10 μm or more, 40 μm or more, 60 μm or more, or 80 μm or more and may be 200 μm or less, 180 μm or less, or 160 μm or less.

The electrolyte layer 7 contains a polymer (hereinafter, also referred to as "polymer B"), oxide particles, and an electrolyte salt (hereinafter, also referred to as "electrolyte salt B").

The polymer B is a polymer (binder polymer) that serves as the base for retaining another material included in the electrolyte layer 7 (forms a continuous phase). The polymer B preferably has a first structural unit selected from the group consisting of tetrafluoroethylene and vinylidene fluoride.

The polymer B is preferably one or two or more kinds of polymers, and a structural unit (monomer unit) constituting one or two or more kinds of polymers preferably includes a first structural unit (monomer unit) selected from the group consisting of tetrafluoroethylene and vinylidene fluoride and a second structural unit (monomer unit) selected from the group consisting of hexafluoropropylene, acrylic acid, maleic acid, ethyl methacrylate, and methyl methacrylate.

The first structural unit and the second structural unit may constitute a copolymer included in one kind of polymer. That is, in an embodiment, the electrolyte layer 7 contains at least one kinds of copolymer including both the first structural unit and the second structural unit. The copolymer may be a copolymer of vinylidene fluoride and hexafluoropropylene, a copolymer of vinylidene fluoride and maleic acid, a copolymer of vinylidene fluoride and methyl methacrylate, or the like. In a case where the electrolyte layer 7 contains a copolymer, the electrolyte layer 7 may further contain another polymer.

The first structural unit and the second structural unit each may be included in separate polymers and may constitute at least two kinds of polymers of a first polymer having the first structural unit and a second polymer having the second structural unit. That is, in an embodiment, the electrolyte layer 7 contains at least two kinds of polymers of the first polymer including the first structural unit and the second polymer including the second structural unit, as the polymer B. In a case where the electrolyte layer 7 contains the first polymer and the second polymer, the electrolyte layer 7 may further contain another polymer.

The first polymer may be a polymer composed only of the first structural unit, and may be a polymer further having another structural unit in addition to the first structural unit. The other structural unit may be an oxygenated hydrocarbon structure such as ethylene oxide (—$CH_2CH_2O$—). The first polymer may be polytetrafluoroethylene, polyvinylidene fluoride, polyvinylidene fluoride, and a polymer in which the above-described oxygenated hydrocarbon structure is introduced into the molecular structures thereof.

The second polymer may be a polymer composed only of the second structural unit, and may be a polymer further having another structural unit in addition to the second structural unit. The other structural unit may be an oxygenated hydrocarbon structure such as ethylene oxide (—$CH_2CH_2O$—).

Examples of the combination of the first polymer and the second polymer include a combination of polyvinylidene fluoride and polyacrylic acid, a combination of polytetrafluoroethylene and polymethyl methacrylate, and a combination of polyvinylidene fluoride and polymethyl methacrylate.

The content of the first structural unit is preferably 5% by mass or more, more preferably 10% by mass or more, and further preferably 20% by mass or more, based on the total amount of the structural unit constituting the polymer B, from the viewpoint of further improving the strength of the electrolyte layer 7. The content of the first structural unit is preferably 5% by mass or more, more preferably 60% by mass or less, more preferably 40% by mass or less, and further preferably 30% by mass or less, based on the total amount of the structural unit constituting the polymer B, from the viewpoint of further improving affinity with the ionic liquid in a case where the electrolyte layer 7 includes the ionic liquid.

The content of the first structural unit is preferably 50% by mass or more, 70% by mass or more, 80% by mass or more, 90% by mass or more, or 95% by mass or more, based on the sum of the contents of the first structural unit and the second structural unit, from the viewpoint of further improving the strength of the electrolyte layer 7. The content of the first structural unit is preferably 99% by mass or less, 98% by mass or less, 97% by mass or less, or 96% by mass or less, based on the sum of the contents of the first structural unit and the second structural unit, from the viewpoint of further improving affinity with the ionic liquid in a case where the electrolyte layer 7 includes the ionic liquid.

The content of the second structural unit is preferably 1% by mass or more, more preferably 3% by mass or more, and further preferably 5% by mass or more, based on the total amount of the structural unit constituting the polymer B, from the viewpoint of further improving affinity with the ionic liquid in a case where the electrolyte layer 7 includes the ionic liquid. The content of the second structural unit is preferably 5% by mass or more, more preferably 50% by mass or less, more preferably 20% by mass or less, and further preferably 10% by mass or less, based on the total amount of the structural unit constituting the polymer B, from the viewpoint of further improving the strength of the electrolyte layer 7.

The content of the second structural unit is preferably 1% by mass or more, 3% by mass or more, or 4% by mass or more, based on the sum of the contents of the first structural unit and the second structural unit, from the viewpoint of further improving affinity with the ionic liquid in a case where the electrolyte layer 7 includes the ionic liquid. The content of the second structural unit is preferably 50% by mass or less, 40% by mass or less, 30% by mass or less, 20% by mass or less, 10% by mass or less, or 5% by mass or less, based on the sum of the contents of the first structural unit and the second structural unit, from the viewpoint of further improving the strength of the electrolyte layer 7.

The content of the polymer B is preferably 10% by mass or more, more preferably 15% by mass or more, further preferably 20% by mass or more, and particularly preferably 25% by mass or more, based on the total amount of the electrolyte layer, from the viewpoint of further improving the strength of the electrolyte layer 7. The content of the polymer B is preferably 40% by mass or less, more preferably 35% by mass or less, further preferably 30% by mass or less, and particularly preferably 28% by mass or less, based on the total amount of the electrolyte layer, from the viewpoint of further improving electrical conductivity.

The oxide particles are, for example, particles of an inorganic oxide. The inorganic oxide may be, for example, an inorganic oxide including Li, Mg, Al, Si, Ca, Ti, Zr, La, Na, K, Ba, Sr, V, Nb, B, Ge, or the like as a constituent element. The oxide particles are preferably at least one particle selected from the group consisting of $SiO_2$, $Al_2O_3$, AlOOH, MgO, CaO, $ZrO_2$, $TiO_2$, $Li_7La_3Zr_2O_{12}$, and $BaTiO_3$. Since the oxide particles have polarity, the dissociation of the electrolyte in the electrolyte layer 7 is accelerated, and amorphousness of the polymer B promoted to increase the diffusion rate of the cation component of the electrolyte.

The average primary particle size of the oxide particles (the average particle size of the primary particles) is preferably 0.005 μm or more, more preferably 0.01 μm or more, and further preferably 0.015 μm or more, from the viewpoint of further improving electrical conductivity. The average primary particle size of the oxide particles is preferably 1 μm or less, more preferably 0.1 μm or less, and further preferably 0.05 μm or less, from the viewpoint of thinning the electrolyte layer 7. The average primary particle size of the oxide particles is preferably 0.005 to 1 μm, 0.01 to 0.1 μm, or 0.015 to 0.05 μm, from the viewpoint of thinning an electrolytic composition while improving electrical conductivity and the viewpoint of suppressing the protrusion of the oxide particles from the surface of the electrolytic composition. The average primary particle size of the oxide particles can be measured by observing the oxide particles with a transmission electron microscope or the like.

The average particle size of the oxide particles is preferably 0.005 μm or more, more preferably 0.01 μm or more, and further preferably 0.03 μm or more. The average particle size of the oxide particles is preferably 5 μm or less, more preferably 3 μm or less, and further preferably 1 μm or less. The average particle size of the oxide particles is measured by laser diffractometry, and in a case where a cumulative volume size distribution curve is depicted from the small particle size side, the average particle size corresponds to a particle size in which the cumulative volume reaches 50%.

The shape of the oxide particles may be, for example, lumpy or substantially spherical. The aspect ratio of the oxide particles is preferably 10 or less, more preferably 5 or less, and further preferably 2 or less, from the viewpoint of facilitating a decrease in thickness of the electrolyte layer 7. The aspect ratio is defined as a ratio of the length of a particle in the long axis direction (the maximum length of the particle) and the length of the particle in the short axis direction (the minimum length of the particle) in a scanning electron micrograph of the oxide particles. The length of the particle can be obtained by statistically calculating the above-described photograph using commercially available image processing software (for example, image analyzing software, A-ZOKUN (registered trademark), manufactured by Asahi Kasei Engineering Corporation).

The content of the oxide particles is preferably 5% by mass or more, more preferably 7% by mass or more, and further preferably 10% by mass or more, based on the total amount of the electrolyte layer, from the viewpoint of accelerating the dissociation of the electrolyte. The content of the oxide particles is preferably 50% by mass or less, more preferably 40% by mass or less, and further preferably 20% by mass or less, based on the total amount of the electrolyte layer, from the viewpoint of further improving electrical conductivity.

The electrolyte salt B included in the electrolyte layer 7 may be an electrolyte salt exemplified as the electrolyte salt A included in the positive electrode mixture layer 10. The electrolyte salt B included in the electrolyte layer 7 may be the same as or different from the electrolyte salt A included in the positive electrode mixture layer 10.

The content of the electrolyte salt B may be 10% by mass or more and may be 60% by mass or less, based on the total amount of the electrolyte layer, from the viewpoint of suitably producing the electrolyte layer 7. The content of the electrolyte salt B is preferably 20% by mass or more based on the total amount of the electrolyte layer from the viewpoint of increasing the electrical conductivity of the electrolyte layer, and is more preferably 30% by mass or more from the viewpoint that the secondary battery 1 can be charged and discharged at a high load factor.

The electrolyte layer 7 may further contain an ionic liquid. In this case, the electrolyte salt B may exist in a state of being dissolved in the ionic liquid. The ionic liquid included in the electrolyte layer 7 may be an ionic liquid exemplified as the ionic liquid included in the positive electrode mixture layer 10.

The content of the ionic liquid may be 10% by mass or more and may be 60% by mass or less, based on the total amount of the electrolytic composition, from the viewpoint of suitably producing the electrolyte layer 7. The content of the ionic liquid is preferably 55% by mass or less and more preferably 50% by mass or less, based on the total amount of the electrolytic composition, from the viewpoint that the electrical conductivity of the electrolyte layer 7 is increased by increasing the content of the electrolyte salt so that the lithium secondary battery can be charged and discharged at a high load factor.

In a case where the electrolyte layer 7 contains an ionic liquid, the total content of the electrolyte salt B and the ionic liquid is preferably 10% by mass or more, more preferably 25% by mass or more, and further preferably 40% by mass or more, based on the total amount of the electrolyte layer, from the viewpoint of further improving the electrical conductivity and suppressing a decrease in capacity of the secondary battery, and is preferably 80% by mass or less and more preferably 70% by mass or less from the viewpoint of suppressing a decrease in the strength of the electrolyte layer 7.

In a case where the electrolyte layer 7 contains the ionic liquid, the concentration of the electrolyte salt B per unit volume of the ionic liquid is preferably 0.5 mol/L or more, more preferably 0.7 mol/L or more, and further preferably 1.0 mol/L or more, and is preferably 2.0 mol/L or less, more preferably 1.8 mol/L or less, and further preferably 1.6 mol/L or less, from the viewpoint of further improving charge and discharge characteristics.

The thickness of the electrolyte layer 7 is preferably 5 μm or more and more preferably 10 μm or more, from the viewpoint of enhancing the strength and further improving the safety. The thickness of the electrolyte layer 7 is preferably 200 μm or less, more preferably 150 μm or less, and further preferably 100 μm or less, from the viewpoint of further decreasing the internal resistance of the secondary battery and the viewpoint of further improving large-current characteristics.

In another embodiment, it is also conceivable that a second battery member (negative electrode member), which includes the negative electrode current collector 11, the negative electrode mixture layer 12, and the electrolyte layer 7 in this order, is included in the electrode group 2A. FIG. 3(b) is a schematic cross-sectional view illustrating a battery member (positive electrode member) for a secondary battery according to another embodiment, that is, a schematic cross-sectional view illustrating a second battery member (negative electrode member). As illustrated in FIG. 3(b), a second battery member 14 is a negative electrode member which includes the negative electrode current collector 11, the negative electrode mixture layer 12 provided on the negative electrode current collector 11, and the electrolyte layer 7 provided on the negative electrode mixture layer 12 in this order. The electrolyte layer 7 is the same as the electrolyte layer 7 in the first battery member 13 mentioned above, and thus the description thereof will be omitted below.

The negative electrode current collector 11 may be a metal such as aluminum, copper, nickel, or stainless steel, an alloy thereof, and the like. The negative electrode current collector 11 is preferably aluminum and an alloy thereof in order to have lightness in weight and a high weight energy density. The negative electrode current collector 11 is preferably copper from the viewpoint of ease of processing to a thin film and cost.

In an embodiment, the negative electrode mixture layer 12 contains a negative electrode active material, an organic solvent, and an electrolyte salt A.

The negative electrode active material may be a carbon material such as graphite or amorphous carbon, a metal material such as tin or silicon, lithium titanate ($Li_4Ti_5O_{12}$), metallic lithium, or the like.

The content of the negative electrode active material may be 60% by mass or more, 65% by mass or more, or 70% by mass or more, based on the total amount of the negative electrode mixture layer. The content of the negative electrode active material may be 99% by mass or less, 95% by mass or less, or 90% by mass or less, based on the total amount of the negative electrode mixture layer.

The type and the content of the organic solvent and the electrolyte salt A included in the negative electrode mixture layer 12 may be the same as those described in the case of the organic solvent and the electrolyte salt A included in the positive electrode mixture layer 10 mentioned above, respectively. The organic solvent and the electrolyte salt A included in the negative electrode mixture layer 12 may be the same as or different from the organic solvent and the electrolyte salt A included in the positive electrode mixture layer 10.

The negative electrode mixture layer 12 preferably further contains a polymer capable of gelling the organic solvent (polymer A) from the viewpoint of further suppressing the liquid leakage of the organic solvent (electrolytic solution) from the secondary battery 1. In this case, since the organic solvent in the negative electrode mixture layer 12 is gelled, the liquid leakage of the organic solvent from the secondary battery 1 can be suppressed. The type and the content of the polymer A included in the negative electrode mixture layer 12 may be the same as those described in the case of the polymer A included in the positive electrode mixture layer 10 mentioned above. The polymer A included in the negative electrode mixture layer 12 may be the same as or different from the polymer A included in the positive electrode mixture layer 10.

The negative electrode mixture layer 12 may further contain an ionic liquid. The type and the content of the ionic liquid included in the negative electrode mixture layer 12 may be the same as those described in the case of the ionic liquid included in the positive electrode mixture layer 10 mentioned above. The ionic liquid included in the negative electrode mixture layer 12 may be the same as or different from the ionic liquid included in the positive electrode mixture layer 10.

The negative electrode mixture layer 12 may further contain an electrically conductive agent, a binder, and the like. The type and the content of the electrically conductive agent and the binder included in the negative electrode mixture layer 12 may be the same as those described in the case of the electrically conductive agent and the binder included in the positive electrode mixture layer 10 mentioned above, respectively. The electrically conductive agent and the binder included in the negative electrode mixture layer 12 may be the same as or different from the electrically conductive agent and the binder included in the positive electrode mixture layer 10, respectively.

The thickness of the negative electrode mixture layer 12 may be 10 μm or more, 20 μm or more, 40 μm or more, or 60 μm or more. The thickness of the negative electrode mixture layer may be 150 μm or less, 130 μm or less, or 110 μm or less.

Subsequently, a method for manufacturing the aforementioned secondary battery 1 will be described. The method for manufacturing the secondary battery 1 according to an embodiment includes a step (A1) of producing the first battery member (positive electrode member) 13, a step (B1) of producing the second battery member (negative electrode member) 14, and a step (C1) of laminating the first battery member (positive electrode member) 13 and the second battery member (negative electrode member) 14 to obtain the secondary battery 1. Note that, the order of the step (A1) and the step (B1) is arbitrary (any one of the steps may be first executed, and both of the steps may be executed at the same time; the same applies hereinafter).

In an embodiment, the step (A1) includes a step (a) of adding a composition (electrolytic solution composition) containing an organic solvent and an electrolyte salt A into a positive electrode active material layer (electrode active material layer) provided on the positive electrode current collector 9 and containing a positive electrode active material to form the positive electrode mixture layer 10 and a step (b) of providing the electrolyte layer 7 containing a polymer B, oxide particles, and an electrolyte salt B on the positive electrode mixture layer 10. The step (A1) can be said to be a method for manufacturing the first battery member (positive electrode member) 13, the method including the step (a) and the step (b) in this order.

In the step (a), first, a positive electrode laminate, which includes the positive electrode current collector 9 and the positive electrode active material layer provided on the positive electrode current collector 9 and containing a positive electrode active material, is prepared. The positive electrode laminate can be produced, for example, by dispersing a material including a positive electrode active material, an electrically conductive agent, a binder, or the like in a dispersion medium to prepare a slurry, applying this slurry to the positive electrode current collector 9, and then volatilizing the dispersion medium. The dispersion medium is not particularly limited, and may be water, a water-based solvent such as a mixture solvent of alcohol and water, or an organic solvent such as N-methyl-2-pyrrolidone.

Next, the electrolytic solution composition containing the organic solvent and the electrolyte salt A is added into the positive electrode active material layer to form the positive electrode mixture layer 10 (electrode mixture layer). A method of adding the electrolytic solution composition into the positive electrode active material layer may be, for example, dropwise addition, application, printing, spraying, or the like. The obtained positive electrode mixture layer 10 includes a positive electrode active material and an electrolytic solution composition disposed (filled) between positive electrode active materials.

The contents of the organic solvent and the electrolyte salt A in the electrolytic solution composition may be adjusted to substantially coincide with desired contents of respective components in the positive electrode mixture layer 10, respectively.

Subsequently, in the step (b), the electrolyte layer 7 is provided on the positive electrode mixture layer 10 obtained in the step (a). The electrolyte layer 7 may be formed in advance in a sheet form, for example, on a support film formed of a polymer such as polypropylene or polyimide. The electrolyte layer 7 is laminated, for example, by a laminating method preferably along with the support film so that the electrolyte layer 7 is in contact with the positive electrode mixture layer 10. In this case, since the support film is also disposed to cover the positive electrode mixture layer 10 in addition to the electrolyte layer 7, the volatilization of the organic solvent in the positive electrode mixture layer 10 is further suppressed.

In another embodiment, the electrolytic solution composition used in the step (a) further contains a polymer A in addition to the organic solvent and the electrolyte salt A, and in this case, the step (A1) may further include a step (w) of heating the electrolytic solution composition before the step (a). That is, another embodiment of the method for manufacturing the first battery member (positive electrode member) 13 includes the step (w), the step (a), and the step (b) in this order.

In the step (w), by heating the electrolytic solution composition at a temperature T1, the polymer A (further the electrolyte salt A) is dissolved in the organic solvent to obtain a sol-like electrolytic solution composition. The content of the polymer A in the electrolytic solution composition may be adjusted to substantially coincide with a desired content of the polymer A in the positive electrode mixture layer 10.

The temperature T1 is sufficient to be a temperature at which the polymer A can be dissolved in the organic solvent, and may be 60° C. or higher, 80° C. or higher, or 100° C. or higher and may be 160° C. or lower, 140° C. or lower, or 120° C. or lower, for example. The heating time may be 1 hour or longer, 3 hours or longer, or 5 hours or longer, and 10 hours or shorter, 8 hours or shorter, or 6 hours or shorter, for example.

In the step (a) in this embodiment, it is preferable to add the electrolytic solution composition to the positive electrode active material layer before the temperature of the electrolytic solution composition heated in the step (w) excessively decreases, that is, before the viscosity of the sol-like electrolytic solution composition excessively increases (the gelation of the sol-like electrolytic solution composition occurs).

In this embodiment, it is preferable execute a step (x) of leaving the positive electrode mixture layer 10 to stand still in an environment at a temperature T2 lower than the temperature T1 in the step (w) after the step (a). That is, another embodiment of the method for manufacturing the first battery member (positive electrode member) 13 includes the step (w), the step (a), the step (x), and the step (b) in this order. Thereby, the gelation of the organic solvent by the polymer A in the positive electrode mixture layer 10 suitably proceeds.

The temperature T2 in the step (x) may be 0° C. or higher, 10° C. or higher, or 20° C. or higher and may be 60° C. or lower, 50° C. or lower, or 40° C. or lower, for example. The time for standing still in the step (x) may be 10 minutes or longer, 1 hour or longer, or 3 hours or longer and may be 20 hours or shorter, 15 hours or shorter, or 10 hours or shorter, for example.

In another embodiment, the electrolytic solution composition used in the step (a) further contains a polymerizable compound in addition to the organic solvent and the electrolyte salt A, and in this case, the step (A1) may further include a step (y) of polymerizing the polymerizable compound in the positive electrode mixture layer 10 after the step (b). That is, another embodiment of the method for manufacturing the first battery member (positive electrode member) 13 includes the step (a), the step (b), and the step (y) in this order.

In this embodiment, the electrolytic solution composition used in the step (a) contains the organic solvent, the electrolyte salt A, and the polymerizable compound, and preferably further contains a polymerization initiator that initiates the polymerization of the polymerizable compound.

The polymerizable compound is at least one compound selected from the group consisting of a monomer and an oligomer that can constitute the above-described polymer A by polymerization. That is, the polymerizable compound is a compound (a monomer or an oligomer) that becomes a polymer (polymer A) capable of gelling the organic solvent by polymerization.

The polymerizable compound may be at least one compound selected from the group consisting of vinylidene fluoride, hexafluoropropylene, acrylonitrile, methyl methacrylate, N-isopropylacrylamide, methyl acrylate, styrene, pentaerythritol tetraacrylate, diallyldimethyl ammonium-bis(trifluoromethane sulfonyl)imide, 2,2,3,3,4,4,5,5,6,6,7,7-dodecafluoroheptyl acrylate, 2,2,3,3,4,4,5,5,6,6,7,7-dodecafluoroheptyl methacrylate, (ethylene glycol) methacrylate, trimethylolpropane triacrylate, isoprene monoxide, ethylene glycol diglycidylether, and oligomers thereof.

The content (total content) of the polymerizable compound in the electrolytic solution composition may be adjusted to substantially coincide with a desired content of the polymer A in the positive electrode mixture layer 10.

The polymerization initiator may be appropriately selected from known polymerization initiators. The polymerization initiator may be, for example, an azo compound-based polymerization initiator, an organic peroxide-based polymerization initiator, or the like, and may be a polymerization initiator other than these polymerization initiators.

Examples of the azo compound-based polymerization initiator include 2,2'-azobis(isobutyronitrile) (AIBN), 1-[(1-cyano-1-methylethyl)azo]formamide, 2,2'-azobis(N-butyl-2-methylpropionamide), 2,2'-azobis(N-cyclohexyl-2-methylpropionamide), 2,2'-azobis(2,4,4-trimethylpentane), and 2,2'-azobis(4-methoxy-2,4-dimethylvaleronitrile).

Examples of the organic peroxide-based polymerization initiator include benzoyl peroxide (BPO), tert-butylperoxy acetate, 2,2-di-(tert-butylperoxy)butane, tert-butylperoxy benzoate, n-butyl-4,4-di-(tert-butylperoxy) valerate, di-(2-tert-butylperoxyisopropyl)benzene, dicumyl peroxide, di-tert-hexyl peroxide, 2,5,-dimethyl-2,5,-di(tert-butylperoxy) hexane, tert-butyl cumyl peroxide, di-tert-butylperoxy, diisopropylbenzene hydroperoxide, p-menthane hydroperoxide, 1,1,3,3,-tetramethylbutyl hydroperoxide, cumene hydroperoxide, tert-butylhydroperoxide, and tert-butyltrimethylsilyl peroxide.

The content of the polymerization initiator in the electrolytic solution composition may be, for example, 0.1 parts by mass or more and may be 10 parts by mass or less, with respect to 100 parts by mass of the content of the polymerizable compound.

In the step (y), the polymerizable compound in the positive electrode mixture layer 10 is polymerized. Thereby, the polymer A is formed from the polymerizable compound, and the organic solvent can be gelled by the polymer A.

The polymerization method may be, for example, a method of performing polymerization by heating (heating polymerization). The heating temperature and the heating time may be appropriately set according to the types of the polymerizable compound. The heating temperature may be 30° C. or higher, 40° C. or higher, or 50° C. or higher and may be 100° C. or lower, 90° C. or lower, or 80° C. or lower, for example. The heating time may be 1 hour or longer, 3 hours or longer, or 5 hours or longer, and 48 hours or shorter, 32 hours or shorter, or 16 hours or shorter, for example. The polymerization method may be a method of performing polymerization by irradiation with light (photopolymerization).

The step (B1) is similar to the step (A1) (the "positive electrode" in the step (A1) may be read as the "negative electrode"), and thus the detailed description will be omitted. For example, it is conceivable that an embodiment of a method for manufacturing the second battery member (negative electrode member) 14 includes the aforementioned step (a) and step (b) (provided that, the "positive electrode" is read as the "negative electrode") in this order. Furthermore, it is conceivable that another embodiment of the method for manufacturing the second battery member (negative electrode member) 14 includes the aforementioned step (w), step (a), and step (b) (provided that, the "positive electrode" is read as the "negative electrode") in this order. Furthermore, it is conceivable that still another embodiment of the method for manufacturing the second battery member (negative electrode member) 14 includes the aforementioned step (a), step (b), and step (y) (provided that, the "positive electrode" is read as the "negative electrode") in this order.

In the step (C1), the first battery member (positive electrode member) 13 obtained in the step (A1) and the second battery member (negative electrode member) 14 obtained in the step (B1) are laminated, for example, by a laminating method so that the electrolyte layer 7 in the first battery member (positive electrode member) 13 and the electrolyte layer 7 in the second battery member (negative electrode member) 14 are in contact with each other, and thereby the secondary battery 1 is obtained.

In the method for manufacturing the secondary battery 1 according to the embodiment described above, in the step (C1), the first battery member (positive electrode member) 13 including the electrolyte layer 7 and the second battery member (negative electrode member) 14 including the electrolyte layer 7 are laminated, but in the method for manufacturing the secondary battery 1 according to another embodiment, the positive electrode 6 not including the electrolyte layer 7 (the positive electrode current collector 9 and the positive electrode mixture layer 10) and the second battery member (negative electrode member) 14 including the electrolyte layer 7 may be laminated.

That is, the manufacturing method according to another embodiment includes a step (A2) of producing the positive electrode 6, the aforementioned step (B1) of producing the second battery member (negative electrode member) 14, and a step (C2) of laminating the positive electrode 6 and the second battery member (negative electrode member) 14 to obtain the secondary battery 1. Note that, the order of the step (A2) and the step (B1) is arbitrary.

The step (A2) may include the aforementioned step (a), may be include the aforementioned step (w) and step (a) in this order, and may include the aforementioned step (a) and step (y).

The step (A2) preferably further includes a step (z) of providing a cover film on the positive electrode mixture layer 10 obtained in the step (a) to cover the positive electrode mixture layer 10 immediately after the step (a). That is, the step (A2) may preferably include the step (a) and the step (z) in this order, may include the step (w), the step (a), and the step (z) in this order, may include the step (w), the step (a), the step (z), and the step (x) in this order, and may include the step (a), the step (z), and the step (y) in this order. Thereby, the cover film suppresses the volatilization of the organic solvent in the positive electrode mixture layer 10, and in a case where the positive electrode mixture layer 10 contains the polymer A, the gelation of the organic solvent suitably proceeds without changing the composition of the organic solvent. The cover film may be, for example, a film formed of a polymer such as polypropylene or polyimide.

In a case where the step (A2) includes the step (z), from the viewpoint of suppressing the volatilization of the organic solvent in the positive electrode mixture layer 10, it is preferable to use an organic solvent having a boiling point (a boiling point in an atmospheric pressure) of 160° C. or higher, 180° C. or higher, or 200° C. or higher as the organic solvent included in the electrolytic solution composition (positive electrode mixture layer 10). Examples of the organic solvent having such a boiling point among the aforementioned organic solvent include ethylene carbonate, propylene carbonate, and γ-butyrolactone.

In the step (C2), the positive electrode 6 obtained in the step (A2) and the second battery member (negative electrode member) 14 obtained in the step (B1) are laminated, for example, by a laminating method so that the positive electrode mixture layer 10 in the positive electrode 6 and the electrolyte layer 7 in the second battery member (negative electrode member) 14 are in contact with each other, and thereby the secondary battery 1 is obtained. In a case where a cover film is provided in the positive electrode 6, the cover film is peeled off from the positive electrode 6, and then the positive electrode 6 and the second battery member (negative electrode member) 14 may be laminated.

In the method for manufacturing the secondary battery 1 according to the above-described embodiment, in the step (C2), the positive electrode 6 not including the electrolyte layer 7 and the second battery member (negative electrode member) 14 including the electrolyte layer 7 are laminated, but in the method for manufacturing the secondary battery 1 according to another embodiment, the first battery member (positive electrode member) 13 including the electrolyte layer 7 and the negative electrode 8 not including the electrolyte layer 7 (the negative electrode current collector 11 and the negative electrode mixture layer 12) may be laminated.

That is, the manufacturing method according to another embodiment includes the aforementioned step (A1) of producing the first battery member (positive electrode member) 13, a step (B2) of producing the negative electrode 8, and a step (C3) of laminating the first battery member (positive electrode member) 13 and the negative electrode 8 to obtain the secondary battery 1. Note that, the order of the step (A1) and the step (B2) is arbitrary.

The step (B2) is similar to the step (A2) (the "positive electrode" in the step (A2) may be read as the "negative electrode"), and thus the detailed description will be omitted. The step (C3) is similar to the step (C2) (the "positive electrode" and the "negative electrode" in the step (C2) may be read to each other), and thus the detailed description will be omitted.

In the method for manufacturing the secondary battery 1 according to each of the above-described embodiment, the electrolyte layer 7 is provided in advance in at least one of the positive electrode 6 and the negative electrode 8 (at least one of the first battery member (positive electrode member) 13 and the second battery member (negative electrode member) 14 is produced in advance), but in the method for manufacturing the secondary battery 1 according to another embodiment, the positive electrode 6 not including the electrolyte layer 7 (the positive electrode current collector 9 and the positive electrode mixture layer 10) and the negative electrode 8 (the negative electrode current collector 11, the negative electrode mixture layer 12), and the electrolyte layer 7 may be laminated.

That is, the manufacturing method according to another embodiment includes the aforementioned step (A2) of producing the positive electrode 6, the aforementioned step (B2) of producing the negative electrode 8, and a step (C4) of laminating the positive electrode 6, the electrolyte layer 7, and the negative electrode 8 in this order to obtain the secondary battery 1. Note that, the order of the step (A2) and the step (B2) is arbitrary.

In the step (C4), the positive electrode 6 obtained in the step (A2), the electrolyte layer 7, and the negative electrode 8 obtained in the step (B2) are laminated, for example, by a laminating method so that the positive electrode mixture layer 10 in the positive electrode 6, the electrolyte layer 7, and the negative electrode mixture layer 12 in the negative electrode 8 are adjacent to each other in this order, and thereby the secondary battery 1 is obtained.

The electrolyte layer 7 may be formed in advance in a sheet form, for example, on the aforementioned support film, and in this case, the positive electrode 6 and the negative electrode 8 may be laminated after the support film is peeled off. In a case where a cover film is provided in each of the positive electrode 6 and the negative electrode 8, the cover film is peeled off from each of the positive electrode 6 and the negative electrode 8, and then the positive electrode 6, the electrolyte layer 7, and the negative electrode 8 may be laminated.

In this embodiment, in a case where the electrolytic solution composition (positive electrode mixture layer 10) used in the step (A2) contains the above-described polymer A, as mentioned above, in the step (A2), the step (x) of leaving the positive electrode mixture layer 10 to stand still may be executed. Alternatively, the step (x) may be executed after the step (C4) (after the positive electrode 6, the electrolyte layer 7, and the negative electrode 8 are laminated) without executing the step (x) in the step (A2).

Similarly, also in a case where the electrolytic solution composition (negative electrode mixture layer 12) used in the step (B2) contains the above-described polymer A, in the step (B2), the step (x) of leaving the negative electrode mixture layer 12 to stand still may be executed, or the step (x) may be executed after the step (C4) (after the positive electrode 6, the electrolyte layer 7, and the negative electrode 8 are laminated) without executing the step (x) in the step (B2).

Furthermore, in a case where the electrolytic solution composition (positive electrode mixture layer 10) used in the step (A2) contains the above-described polymerizable compound, as mentioned above, in the step (A2), the step (y) of polymerizing the polymerizable compound in the positive electrode mixture layer 10 may be executed. Alternatively, the step (y) may be executed after the step (C4) (after the positive electrode 6, the electrolyte layer 7, and the negative electrode 8 are laminated) without executing the step (y) in the step (A2).

Similarly, also in a case where the electrolytic solution composition (negative electrode mixture layer 12) used in the step (B2) contains the above-described polymerizable compound, in the step (B2), the step (y) of polymerizing the polymerizable compound in the negative electrode mixture layer 12 may be executed, or the step (y) may be executed after the step (C4) (after the positive electrode 6, the electrolyte layer 7, and the negative electrode 8 are laminated) without executing the step (y) in the step (B2).

That is, the method for manufacturing the secondary battery 1 according to another embodiment may include the step (A2), the step (B2), the step (C4), and the step (x) in this order, and may include the step (A2), the step (B2), the step (C4), and the step (y) in this order. Note that, the order of the step (A2) and the step (B2) is arbitrary.

In the method for manufacturing the secondary battery 1 according to each of the above-described embodiment, since the volatilization of the organic solvent can be suppressed, a change between the blending ratio of each component of the electrolytic solution composition added to the positive electrode mixture layer 10 or the negative electrode mixture layer 12 and the blending ratio of each component in the positive electrode mixture layer 10 or the negative electrode mixture layer 12 is less likely to occur. Therefore, since it is sufficient to prepare the electrolytic solution composition at substantially the same as the composition of the positive electrode mixture layer 10 or the negative electrode mixture layer 12 according to the characteristics of the secondary battery 1 to be obtained, the secondary battery 1 having desired characteristics can be suitably obtained.

Furthermore, in a case where the organic solvent is gelled, although it is general to volatilize the organic solvent, in the method for manufacturing the secondary battery 1 according to each of the above-described embodiment, the organic solvent can be gelled without the step of volatilizing the organic solvent, and thus the secondary battery 1 having desired characteristics can be more suitably obtained as compared to a conventional case. In addition, when the organic solvent and the polymer A or the polymerizable compound are added in advance to the electrode mixture layers 10 and 12 and then the organic solvent is gelled, it is not necessary to inject the electrolytic solution after the positive electrode 6, the electrolyte layer 7, and the negative electrode 8 are laminated, and thus permeability of the electrolytic solution (particularly, permeability to the electrode mixture layers 10 and 12) that may be problematic when the secondary battery 1 increases in area in order to increase the energy density can be secured.

Figure 4:
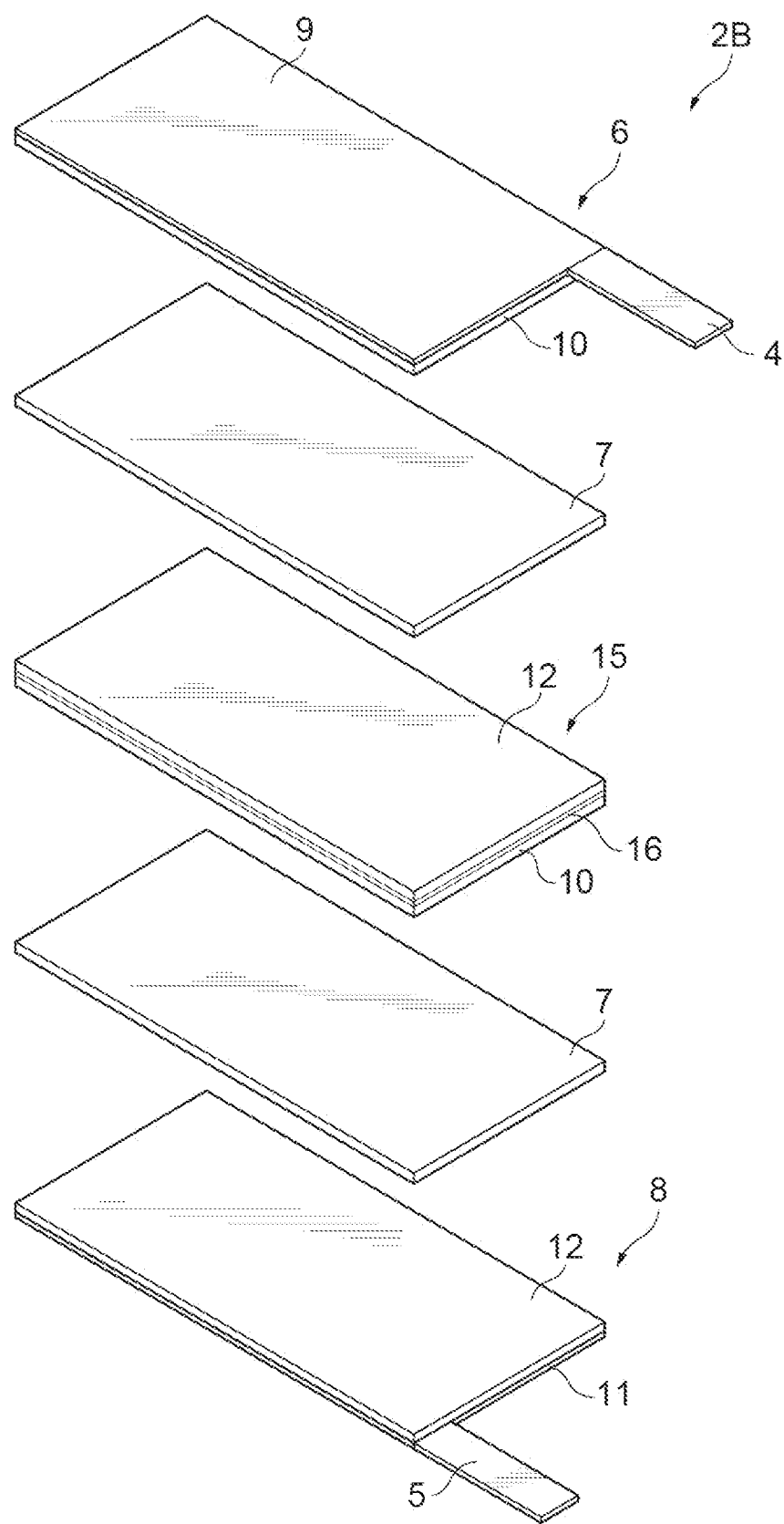
FIG. 4 is an exploded perspective view illustrating another embodiment of the electrode group of the secondary battery.

Next, another embodiment of the electrode group 2 of the secondary battery illustrated in FIG. 1 will be described. FIG. 4 is an exploded perspective view illustrating another embodiment of the electrode group of the secondary battery. In FIG. 4, the same symbol as an electrode group 2B illustrated in FIG. 2 is given, and the duplicative description will be omitted. As illustrated in FIG. 4, the secondary battery in another embodiment is different from the secondary battery in the aforementioned embodiment, in that the electrode group 2B further includes a bipolar electrode 15. That is, the electrode group 2B includes the positive electrode 6, the first electrolyte layer 7, the bipolar electrode 15, the second electrolyte layer 7, and the negative electrode 8 in this order.

The bipolar electrode 15 includes a bipolar electrode current collector 16, the positive electrode mixture layer 10 provided on the surface of the bipolar electrode current collector 16 on the negative electrode 8 side, and the negative electrode mixture layer 12 on the surface of the bipolar electrode current collector 16 on the positive electrode 6 side.

Figure 5:
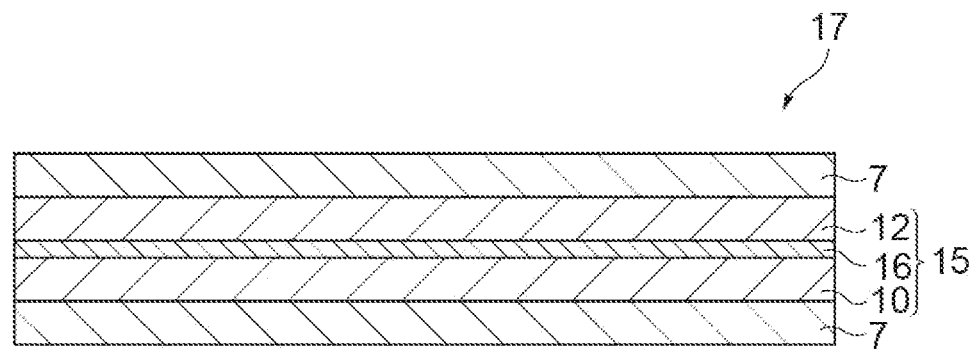
FIG. 5 is a schematic cross-sectional view illustrating a battery member (bipolar electrode member) for a secondary battery according to another embodiment.

It is conceivable that a third battery member (bipolar electrode member), which includes the first electrolyte layer 7, the bipolar electrode 15, and the second electrolyte layer 7 in this order, is included in the electrode group 2B. FIG. 5 is a schematic cross-sectional view illustrating a third battery member (bipolar electrode member) that is a battery member for a secondary battery according to another embodiment. As illustrated in FIG. 5, a third battery member 17 includes a bipolar electrode current collector 16, the positive electrode mixture layer 10 provided one surface of the bipolar electrode current collector 16, the second electrolyte layer 7 provided on the positive electrode mixture layer 10 opposite to the bipolar electrode current collector 16, the negative electrode mixture layer 12 provided on the other surface of the bipolar electrode current collector 16, and the first electrolyte layer 7 provided on the negative electrode mixture layer 12 opposite to the bipolar electrode current collector 16.

The bipolar electrode current collector 16 is formed, for example, of a metal simple substance such as aluminum, stainless steel, or titanium, a clad material obtained by roll-bonding aluminum and copper or stainless steel and copper.

The types of the first electrolyte layer 7 and the second electrolyte layer 7 may be the same as or different from each other, and preferably are the same as each other.

In the secondary battery 1 described above, by using the organic solvent in the electrode mixture layers 10 and 12, an interface between the electrode active material and the electrolyte salt, which is an ion conductive component, and an interface between the electrode mixture layers 10 and 12 and the electrolyte layer 7 are favorably formed, respectively, and the discharge characteristics and the capacity retention rate of the secondary battery 1 can be improved. In addition, in the case of using the organic solvent, generally, safety is likely to be impaired, but by using the electrolyte layer 7 containing a polymer, oxide particles, and an electrolyte salt, safety can also be increased as compared to a conventional separator configured only by a polymer.

Furthermore, in a case where the electrode mixture layers 10 and 12 contain the polymer A capable of gelling the organic solvent, the volatilization of the organic solvent (electrolytic solution) in the electrode mixture layers 10 and 12 is suppressed. Thereby, the safety of the secondary battery 1 can be further improved, and only the electrode mixture layers 10 and 12 (or only the electrodes (the positive electrode 6 and the negative electrode 8) or the battery members (the positive electrode member 13 and the negative electrode member 14)) can be stored for a long period of time, and thus the secondary battery 1 can also be produced simply by a simple step of laminating those components as needed.

As described above, since the aforementioned secondary battery 1 is excellent in safety and is also excellent in discharge characteristics and a capacity retention rate, in this secondary battery 1, the size and the energy density of the secondary battery 1 can be increased, and a risk such as ignition, which is particularly problematic at this time, is reduced. Therefore, this secondary battery 1 is, for example, suitable for use applications of large-sized secondary batteries requiring high energy density, and is particularly suitable as an in-vehicle secondary battery that is mounted in vehicles such as automobiles.

EXAMPLES

Hereinafter, the present invention will be described in more detail by means of Examples; however, the present invention is not limited to these Examples.

Example 1

[Production of Positive Electrode Active Material Layer]

66 parts by mass of $Li(Co_{1/3}Ni_{1/3}Mn_{1/3})O_2$ (positive electrode active material), 4 parts by mass of acetylene black (electrically conductive agent, trade name: Li400, average particle size: 48 nm (manufacturer catalog value), Denka Company Limited), 14 parts by mass of a polyvinylidene fluoride solution (a binder, trade name: KUREHA KF POLYMER #1120, solid content: 12% by mass, KUREHA CORPORATION), and 15 parts by mass of N-methyl-2-pyrrolidone (dispersion medium, NMP) were mixed to prepare a slurry. This slurry was applied onto the positive electrode current collector (an aluminum foil having a thickness of 20 μm), dried at 120° C., and then rolled, thereby forming a positive electrode active material layer having a coating amount on one side of 120 g/m² and a mixture density of 2.7 g/cm³.

[Production of Negative Electrode Active Material Layer]

52 parts by mass of graphite (negative electrode active material), 0.4 parts by mass of carbon nanotube (electrically conductive agent, trade name: VGCF, fiber diameter: 150 nm (manufacturer catalog value), Showa Denko K.K.), 1.4 parts by mass of high-purity graphite (electrically conductive agent, trade name: JSP, average particle size: 7 μm (manufacturer catalog value), Nippon Kokuen Group), 21.8 parts by mass of polyvinylidene fluoride solution (a binder, trade name: KUREHA KF POLYMER #9130, solid content: 13% by mass, KUREHA CORPORATION), and 24.4 parts by mass of N-methyl-2-pyrrolidone (dispersion medium, NMP) were mixed to prepare a slurry. This slurry was applied onto the negative electrode current collector (a copper foil having a thickness of 10 μm), dried at 80° C., and then rolled, thereby forming a negative electrode active material layer having a coating amount on one side of 60 g/m² and a mixture density of 1.6 g/cm³.

[Production of Electrolyte Layer]

Lithium bis(fluorosulfonyl)imide (LiFSI) was used as the electrolyte salt, and the electrolyte salt was dissolved in 1-ethyl-3-methylimidazolium-bis(fluorosulfonyl)imide (EMIFSI) as the ionic liquid at a concentration of 1.5 mol/L. 43 parts by mass of the ionic liquid dissolved in the electrolyte salt as described above, 23 parts by mass of $SiO_2$ particles (trade name: AEROSIL OX50, NIPPON AEROSIL CO., LTD.), 34 parts by mass of a binder (trade name: KUREHA KF POLYMER #8500, KUREHA CORPORATION), and 143 parts of NMP were mixed to prepare a slurry. This slurry was applied onto the support film (made of polypropylene) and dried at 80° C., thereby producing an electrolyte layer (electrolyte sheet) having a thickness of 20 μm.

[Preparation of Electrolytic Solution Composition]

A solution A in which lithium hexafluoro phosphate ($LiPF_6$) as the electrolyte salt was dissolved in the organic solvent obtained by mixing ethylene carbonate (EC), propylene carbonate (PC), ethyl methyl carbonate (EMC), and diethyl carbonate (DEC) at a ratio of EC:PC:EMC:DEC=20:20:35:25 (mass ratio) to be 1.2 mol/L. With respect to 95 parts by mass of this solution A, 5 parts by mass of a copolymer of vinylidene fluoride and hexafluoropropylene (P(VDF-HFP)) was added and heated at 80° C., thereby obtaining a sol-like electrolytic solution composition.

[Production of Battery Member]

The sol-like electrolytic solution composition was uniformly applied onto each of the positive electrode active material layer and the negative electrode active material layer to obtain a positive electrode mixture layer and a negative electrode mixture layer. The electrolyte layer was transferred (laminated) as the whole support film on each of the positive electrode mixture layer and the negative electrode mixture layer thus obtained so that the electrolyte layer was in contact with each electrode mixture layer. Thereafter, after standing still at 25° C. for 12 hours, the organic solvent was gelled, and thereby a positive electrode member and a negative electrode member including a gel-like electrolytic solution composition in each of the positive electrode mixture layer and the negative electrode mixture layer.

[Production of Secondary Battery]

The support films of the positive electrode member and the negative electrode member were peeled off, the respective electrolyte layers of the positive electrode member and the negative electrode member were pasted to each other, and then the resultant product was punched into a circle having a diameter of 16 mm. This punched product was disposed in a CR2032-type coin cell container, and then the upper part of the battery case was swaged through an insulating gasket to be tightly sealed, thereby obtaining a secondary battery.

[Evaluation of Battery Characteristics]

Regarding the produced secondary battery, the battery characteristics at 25° C. were measured under the following charging and discharging condition by using a charging and discharging device (manufactured by TOYO SYSTEM Co., LTD.).

(1) After constant-current and constant-voltage (CCCV) charging was performed at a final voltage of 4.2 V and 0.1 C, charging and discharging of performing constant-current (CC) discharging to a final voltage of 2.7 V at 0.1 C was performed twice, and the secondary battery was initialized. A condition for terminating the CCCV charging was set when the current value reached 0.05 C or more or after a lapse of 20 hours. Note that, "C" means "current value (A)/battery capacity (Ah)". The discharge capacity at the second cycle was regarded as the discharge capacity at 0.1 C.

(2) Next, after constant-current and constant-voltage (CCCV) charging was performed at a final voltage of 4.2 V and 0.1 C, the cycle of constant-current (CC) discharging to a final voltage of 2.7 V at 0.5 C was performed once, and the discharge capacity at 0.5 C was determined.

(3) Next, after constant-current and constant-voltage (CCCV) charging was performed at a final voltage of 4.2 V and 0.1 C, the cycle of constant-current (CC) discharging to a final voltage of 2.7 V at 2 C was performed once, and the discharge capacity at 0.5 C was determined.

The 0.1 C discharge characteristics, 0.5 C discharge characteristics, and 2 C discharge characteristics were calculated from the obtained discharge capacities based on the following formulas. The results are shown in Table 1. In the 0.1 C discharge characteristics, it can be said that, as a value thereof increases, a high capacity can be attained from the battery at a low current. In the 0.5 C and 2 C discharge characteristics, it can be said that, as a value thereof increases, the output characteristics of the battery are excellent.

0.1 C discharge characteristics (%) =

Discharge capacity obtained in (1)/Designed discharge capacity × 100

0.5 C discharge characteristics (%) =

Discharge capacity obtained in (2)/Designed discharge capacity × 100

2C discharge characteristics (%)=Discharge capacity obtained in (3)/Designed discharge capacity × 100

(4) Next, after constant-current and constant-voltage (CCCV) charging was performed at a final voltage of 4.2 V and 0.1 C, the cycle of constant-current (CC) discharging to a final voltage of 2.7 V at 0.1 C was performed 100 cycles, and the discharge capacity at the time point of 100-th cycle was determined. The capacity retention rate at the time point of 100-th cycle was calculated based on the following formula.

Capacity retention rate at the time point of 100-th cycle=Discharge capacity obtained in (4)/Discharge capacity obtained in (1)

Example 2

Production and evaluation of a secondary battery were performed in the same manner as in Example 1, except that [Production of battery member] of Example 1 was changed as follows.

Immediately after the sol-like electrolytic solution composition was uniformly applied onto each of the positive electrode active material layer and the negative electrode active material layer to obtain a positive electrode mixture layer and a negative electrode mixture layer, the positive electrode mixture layer, the electrolyte layer, and the negative electrode mixture layer were stacked in this order. Next, after standing still at 25° C. for 12 hours, the organic solvent was gelled to integrally form the positive electrode mixture layer/the electrolyte layer/the negative electrode mixture layer.

Example 3

Production and evaluation of a secondary battery were performed in the same manner as in Example 1, except that in [Preparation of electrolytic solution composition] of Example 1, a solution B obtained by further externally adding 1 part by mass of vinylene carbonate (VC) with respect to 100 parts by mass of the solution A was used instead of the solution A.

Comparative Example 1

Production and evaluation of a secondary battery were performed in the same manner as in Example 1, except that [Preparation of electrolytic solution composition] and [Production of battery member] of Example 1 were changed as follows.

A solution obtained by adding and dissolving 40 parts by mass of acetone to 10 parts by mass of polymethylmethacrylate and 90 parts by mass of a solution obtained by dissolving LiFSI in EMIFSI at 1.5 mol/L were mixed to obtain a sol-like solution. This solution was used instead of the electrolytic solution composition of Example 1 and was applied onto each of the positive electrode active material layer and the negative electrode active material layer and vacuum-dried at 80° C. for 12 hours to volatilize acetone, thereby obtaining a positive electrode member and a negative electrode member which contain a gel-like composition including a polymer (polymethylmethacrylate) and an ionic liquid (EMIFSI).

TABLE 1

| | 0.1 C discharge characteristics (%) | 0.5 C discharge characteristics (%) | 2 C discharge characteristics (%) | Capacity retention rate (%) |
|---|---|---|---|---|
| Example 1 | 100 | 99 | 95 | 91 |
| Example 2 | 100 | 99 | 97 | 92 |
| Example 3 | 99 | 98 | 94 | 95 |
| Comparative Example 1 | 95 | 30 | 13 | 88 |

It was found that the secondary batteries (Examples 1 to 3) produced by using the electrode mixture layer containing the organic solvent are excellent in discharge characteristics as compared to the secondary battery (Comparative Example 1) produced by using the electrode mixture layer containing the ionic liquid. The reason for this is considered that, by using the electrode mixture layer containing the organic solvent, an interface between the electrode active material and the electrolyte salt, which is an ion conductive component, and an interface between the electrode mixture layer and the electrolyte layer are favorably formed, respectively, and the output characteristics of the secondary battery are improved.

REFERENCE SIGNS LIST

1: secondary battery, 2, 2A, 2B: electrode group, 3: battery outer casing body, 4: positive electrode current collector tab, 5: negative electrode current collector tab, 6: positive electrode, 7: electrolyte layer, 8: negative electrode, 9: positive electrode current collector, 10: positive electrode mixture layer, 11: negative electrode current collector, 12: negative electrode mixture layer, 13: first battery member, 14: second battery member, 15: bipolar electrode, 16: bipolar electrode current collector, 17: third battery member.

The invention claimed is:
1. A battery member comprising:
a current collector;
an electrode mixture layer provided on the current collector; and
an electrolyte layer provided on the electrode mixture layer,
wherein the electrode mixture layer comprises an electrode active material, an organic solvent, and an electrolyte salt,
the electrolyte layer is a pre-formed electrolyte sheet and comprises a polymer, an oxide particle, and an electrolyte salt, wherein the polymer comprises a copolymer comprising a first structural unit selected from the group consisting of tetrafluoroethylene and vinylidene fluoride; and a second structural unit selected from the group consisting of hexafluoropropylene, acrylic acid, maleic acid, ethyl methacrylate, and methyl methacrylate, and wherein a content of the first structural unit is 80% by mass or more based on a sum of contents of the first structural unit and the second structural unit.

2. The battery member according to claim 1, wherein the organic solvent comprises a carbonic acid ester.

3. The battery member according to claim 1, wherein the electrode mixture layer further comprises a polymer capable of gelling the organic solvent.

4. A secondary battery comprising the battery member according to claim 1.

5. A method for manufacturing a battery member, the method comprising:
- a step (a) of adding a composition comprising an organic solvent and an electrolyte salt into an electrode active material layer to form an electrode mixture layer, wherein the electrode active material layer comprises an electrode active material and is provided on a current collector; and
- a step (b) of providing an electrolyte layer comprising a polymer, an oxide particle, and an electrolyte salt on the electrode mixture layer,
- wherein the electrolyte layer is formed in a sheet form in advance of providing the electrolyte layer on the electrode mixture layer, wherein the polymer comprises a copolymer comprising a first structural unit selected from the group consisting of tetrafluoroethylene and vinylidene fluoride; and a second structural unit selected from the group consisting of hexafluoropropylene, acrylic acid, maleic acid, ethyl methacrylate, and methyl methacrylate, and wherein a content of the first structural unit is 80% by mass or more based on a sum of contents of the first structural unit and the second structural unit.

6. The method according to claim 5, wherein the organic solvent comprises a carbonic acid ester.

7. The method according to claim 5, wherein the composition further comprises a polymer capable of gelling the organic solvent.

8. The method according to claim 7, further comprising a step of heating the composition before the step (a).

9. The method according to claim 5, wherein the composition further comprises a polymerizable compound, and
the polymerizable compound is a compound that becomes a polymer capable of gelling the organic solvent by polymerization.

10. The method according to claim 9, further comprising a step of polymerizing the polymerizable compound in the electrode mixture layer after the step (b).

11. The method according to claim 5, wherein the step (b) is performed subsequently to the step (a).

* * * * *